United States Patent
Eng et al.

(10) Patent No.: US 8,750,465 B2
(45) Date of Patent: Jun. 10, 2014

(54) VOICE MESSAGE COMMUNICATION METHOD AND SYSTEM

(75) Inventors: Kai Y. Eng, Atlantic Highlands, NJ (US); Pramod Pancha, Belle Mead, NJ (US)

(73) Assignee: Private Group Networks, Inc., Atlantic Highlands, NJ (US)

( * ) Notice: Subject to any disclaimer, the term of this patent is extended or adjusted under 35 U.S.C. 154(b) by 250 days.

(21) Appl. No.: 13/097,630

(22) Filed: Apr. 29, 2011

(65) Prior Publication Data

US 2012/0275579 A1 Nov. 1, 2012

(51) Int. Cl.
*H04M 1/64* (2006.01)
(52) U.S. Cl.
USPC ............ 379/88.12; 379/88.22; 379/88.25; 455/412.2
(58) Field of Classification Search
USPC ............. 379/88.12, 88.22, 88.25, 88.27; 455/412.2, 413
See application file for complete search history.

(56) References Cited

U.S. PATENT DOCUMENTS

| | | | |
|---|---|---|---|
| 2007/0263841 A1* | 11/2007 | Li | 379/265.09 |
| 2009/0117880 A1* | 5/2009 | Sipher | 455/412.2 |
| 2010/0217809 A1* | 8/2010 | Vymenets et al. | 709/206 |

* cited by examiner

*Primary Examiner* — Gerald Gauthier
*Assistant Examiner* — Simon King
(74) *Attorney, Agent, or Firm* — Kaplan, Breyer, Schwarz & Ottesen LLP

(57) ABSTRACT

A system is disclosed which provides communication of recorded voice messages over a network among a plurality of users having voice communication devices. The system has a voice message server connected to the network, which includes a receiver which receives from a sending user's communication device a voice message signal including a header component and a recorded voice message component is stored at the server in association with the corresponding header. The header component identifies the sending user and an intended recipient user, and it is transmitted to the communication device of the intended recipient identified in the header component. The corresponding voice message component is transmitted to the recipient user's communication device in response to the recipient user's communication device requesting it. The recipient user may send a responsive voice message to the server addressed to the sending user.

2 Claims, 3 Drawing Sheets

VOICE MESSAGE COMMUNICATION METHOD AND SYSTEM

BACKGROUND OF THE INVENTION

The present invention relates generally to electrical voice communication and, more particularly, concerns a method and apparatus for achieving interactive communication of recorded voice messages.

Voice messaging systems have been well-known for many years. Typically, they operate very much like an answering machine, providing recording of voice messages in the recipient's voice mailbox when he is not available to answer his telephone. Although technology has been available to assist the recipient in reviewing and managing his voicemail messages, for example Visual Voicemail, the basic nature of voice messaging has not changed, namely, each recipient has his own dedicated mailbox under his exclusive control and, once a caller has recorded a message to the recipient, the caller has no further means to gain access to that message. For example, the caller has no further means to gain access to that message, such as inquiring if the message was indeed listened to by the recipient. As another example, although some mobile telephone voice messaging systems have allowed a caller to go directly to voicemail, there is no sure way for a caller to a public switched telephone network (PSTN) number to get directed, at his choice, into a callee's voicemail system. Moreover, the kind of messaging interactivity available with email or text messaging has never been available with recorded voice messages. The particularly desirable, different the apparent benefits of voice messaging of being personal and expressive of emotion.

Broadly, it is an object of the present invention to overcome the shortcomings of existing voice messaging systems. It is specifically an object of the present invention to provide interactive communication in the system employing a recorded voice messages.

It is another object of the present invention to provide an interactive voice messaging method and apparatus which could be useful immediately and extensively interoperable with existing public networks, such as the PSP and in the Internet. It is also contemplated that the present invention should support mobile users and should allow them to access the voice messaging service easily and with flexibility.

In accordance with one aspect of the invention, a system which provides communication of recorded voice messages over a network among a plurality of users having voice communication devices has a voice message server connected to the network which includes a receiver which receives from a sending user's communication device a voice message signal including a header component and a recorded voice message component is stored at the server in association with the corresponding header. The header component identifies the sending user and intended recipient user, and it is transmitted to the communication device of the intended recipient identified in the header component. The corresponding voice message component is transmitted to the recipient user's communication device in response to the recipient user's communication device requesting it. The recipient user may send a responsive voice message to the server addressed to the sending user.

In accordance with another aspect of the invention, a voice messaging executable program running on the sending user's voice communication device records the user's voice message and creates a voice message component therefrom. Based on user input, it also creates a corresponding header component. It also creates the voice message signal and communicates it to the voice message server. This program also receives from the voice message server a header component of a voice message signal from another user and, responsive to user input, requests from the voice message server a voice message component of a voice message signal from another user.

BRIEF DESCRIPTION OF THE DRAWINGS

The foregoing, and other objects, features and advantages of the present invention will be understood more completely from the following detailed description of presently preferred, but nonetheless illustrative, embodiments in accordance with the present invention, with reference to being hand to the accompanying drawings in which.

DETAILED DESCRIPTION OF THE PREFERRED EMBODIMENT

A system embodying the present invention will facilitate the exchange of voice messages among users of the system. It is contemplated that there will be two categories of users in the system: members and non-members. A member is a user with a registered account in the system, and his primary access to the system is via a communication device, such as a mobile smart phone. In order to be operable in the system, the communication device will need to be provided with an executable mobile application, an "app", as by downloading, which will be familiar to those skilled in the art. Hereinafter, this mobile application will be referred to as the "Voice Messaging App" (VMA). A non-member, on the other hand is a user who is not registered with the system, has no VMA, but is permitted to receive some restrictive service from the system. A non-member may, for example, have access to the system or be accessed by the system via a PSTN telephone. Or a member who does not have access to his communication device may access the system via a PSTN telephone, as a non-member.

Figure 1:
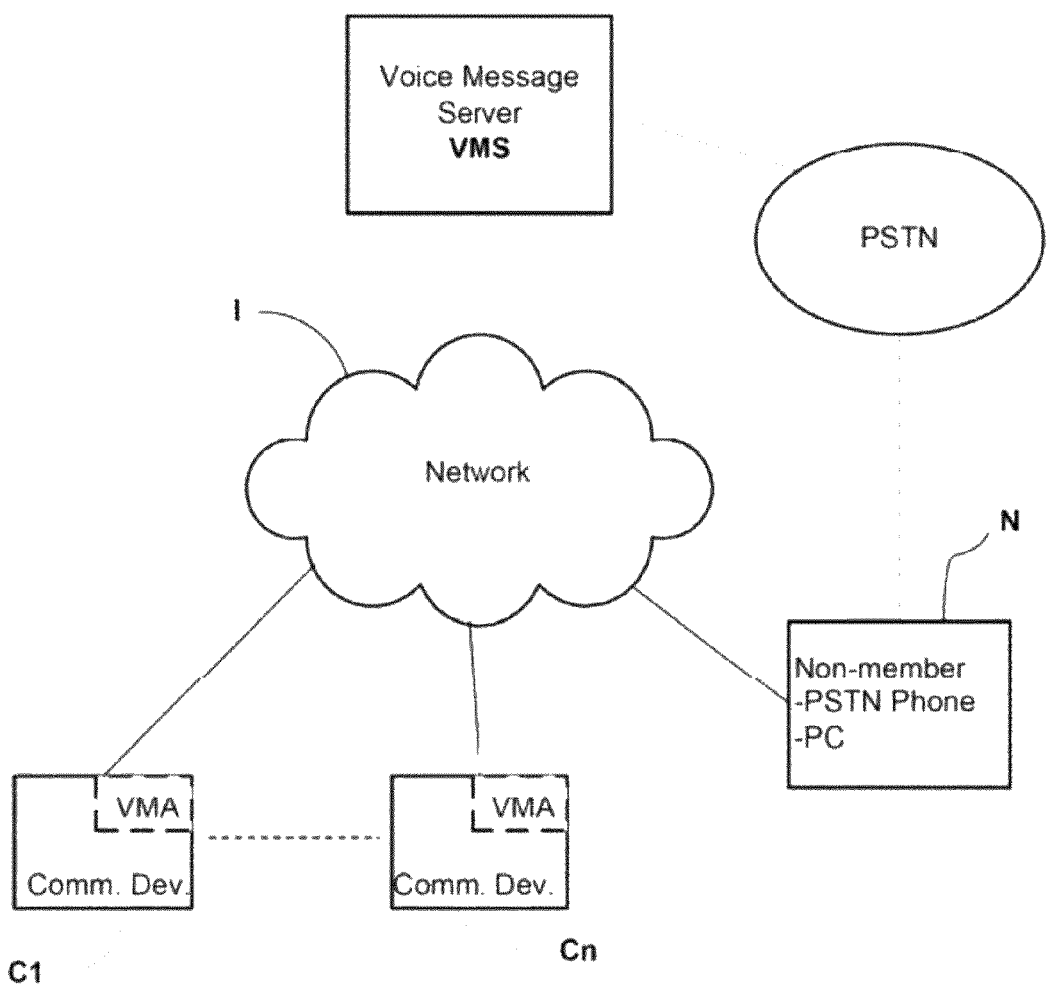
FIG. 1 is a functional block diagram representation of a system embodying the present invention.

FIG. 1 is a functional block diagram representation of a system embodying the present invention. The system is accessed via a publicly available network I, such as the Internet. A Voice Message Server VMS, which is accessible via the network, operates to manage and deliver the intended voice messaging service. Members access the system by communicating with voice message server VMS via the network I, making use of communication devices C1 ... Cn, such as a smart telephone, which runs a voice messaging app (application) VMA, an executable program. Basically, the voice messaging app VMA acts as the client software interacting with server software running on voice messaging server VMS. This type of client-server interoperation is well-known to those skilled in the art, as are the procedures and methods for the setup and distribution of an app on a smart telephone. Similarly, basic operations between the client VMA and the server VMS, such as login, authentication, secure data transfer, link maintenance, and such, should be familiar to those skilled in the art, and will not require further discussion. Client VMA communicates with server VMS via a data Internet link of a communication device, and voice messaging app VMA can be assumed to be active on the cell phone continuously.

Non-members N can gain limited access to voice message server VMS using a telephone over the public switched telephone network PSTN, or via network I, making use of a computerized device, such as an actual computer, a personal digital assistant (PDA), a smart telephone (not equipped with a Voice Messaging App VMA), or the like.

Upon installation of Voice Messaging App VMA, a member is instructed by the software to input information related to other users in a list called "Contacts", similar to the contact list available on most cellular phones. It is also contemplated that contact information could be transferred from an existing contact list on the communications device directly into the Contacts list in Voice Messaging App VMA. Each contact name ultimately has a least one contact address, such as a PSTN telephone number. Some contact names may also include e-mail addresses or other information. In any event, transfer of contact data from Voice Messaging App VMA to server VMS is a straightforward task, and server VMS maintains a directory of all members, as well as their contact information. As a convenience in the present embodiment, it will be assumed that each member has a unique user name, to provide convenient access among members.

Figure 2:
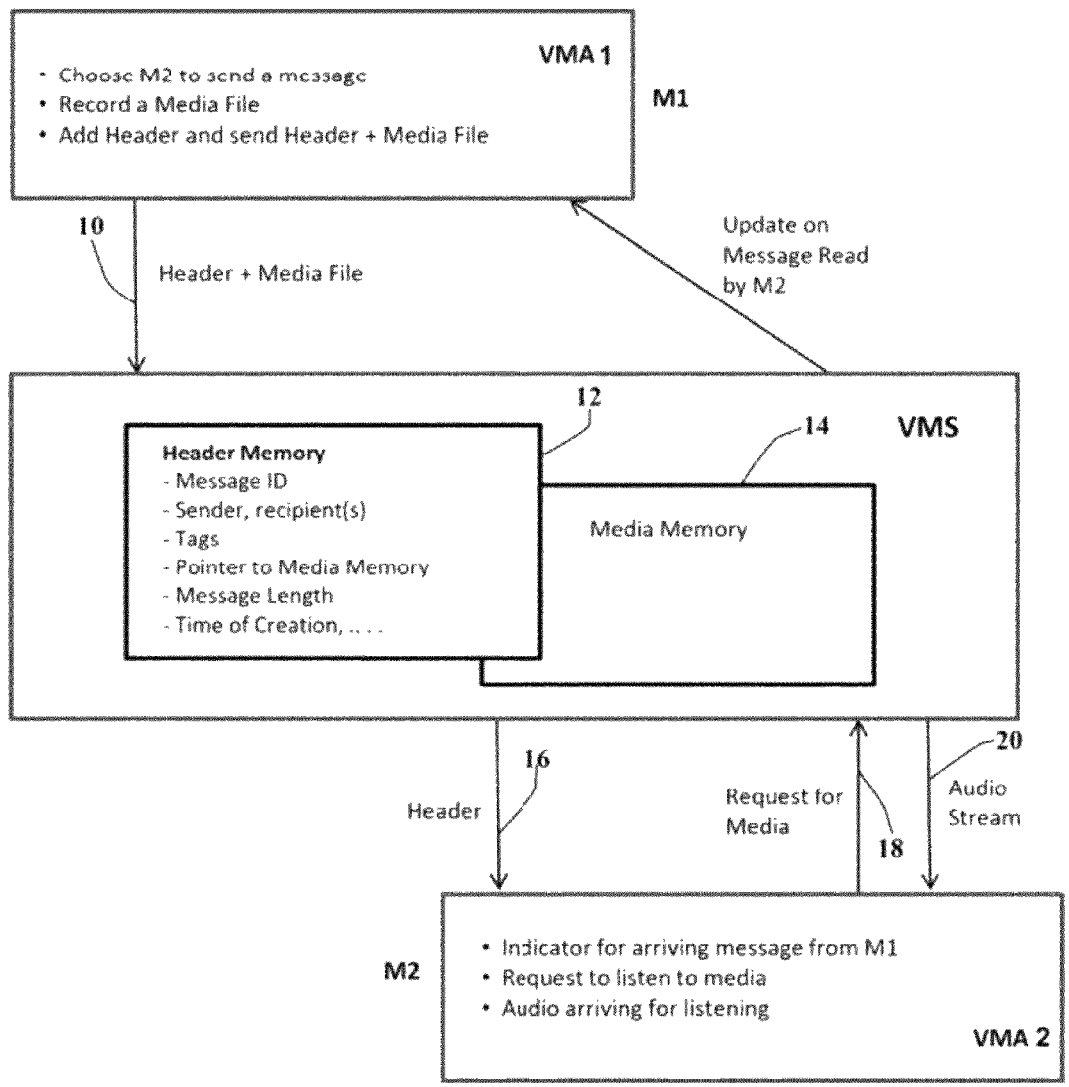
FIG. 2 is a functional block diagram illustrating a messaging interaction between Voice Messaging App VMA and voice message server VMS.

FIG. 2 is a functional block diagram illustrating a messaging interaction between Voice Messaging App VMA and voice message server VMS. To use the service, a first member M1 can open his Contacts list, and choose to compose a message to be sent to a member M2 (or any other user). To enable member M1 to compose a message, Voice Messaging App VMA provides a local function for recording and one's voice message as a voice media file. Preferably the voice media file could also be compressed using any well-known compression technique, such as mp3 or way. This and the ability to decompress and play a voice media file would be built into Voice Messaging App VMA.

Voice Messaging App VMA also creates a data file, which includes relevant information related to the voice media file, such as sender name, recipient name, a message identification number, time of creation, message length, and an optional tag. This tag could be a subject line or some key words designated by M1 for easy reference to this message. The header and associated voice media file form a complete messaging unit, which Voice Messaging App VMA1 of member M1 transmits over the data link to server VMS (transfer10).

At server VMS, the complete message is stored in memory. Preferably, there is a separate header memory 12 and media memory 14, with the header and corresponding media components being stored in association. For example, a pointer to the location of the media file in media memory 14 can be made part of the message identification within the corresponding header stored in the header memory 12. It will be appreciated that the header could be stored in memory with additional parameters added that may be useful for internal processing. Once the storage in header memory 12 and media memory 14 are complete, server VMS transmits (transfer 16) a copy of only the header to the Voice Messaging App VMA2 of member M2 (the voice message recipient).

Voice Messaging App VMA2 then posts a notification for its user that a message has arrived from member M1. If member M2 chooses to listen to the message from member M1, he can select an appropriate command in Voice Messaging App VM2, causing a request 18 to be sent to Voice Message Server VMS for the voice media file. Server VMS will then decompress the voice media file and stream (transfer 20) the audio data to Voice Messaging App VMA2, for listening in real time.

Once the message has been streamed to VMA2, it is marked as "read" in the system so that member M1 can gain acknowledgement information regarding this message delivery to member M2. Also, it should be noted that, until the message is read by member M2, the system allows member M1 to retract or delete the message. In a similar manner, the system can also allow member M1 to specify that the message be released or notified to member M2 at a specified time other than immediately after recording. Those skilled in the art will appreciate that this system can afford many convenient features that conventional voicemail systems cannot provide.

In the present embodiment, the voice message itself is stored permanently in the system only once, at the server VMS. Thus, any message sent or received by a user can be accessed by him any time, unless he chooses to delete it from the server. The central storage of voice messages avoids cluttering up a communication device with storage-hogging voice messages. Headers, on the other hand, are compact files and can be stored and used flexibly in a communication device. Those skilled in the art will appreciate that the default operations described above can easily be modified, if desired. For example, instead of the actual voice recording, server VMS could transmit compressed media files to a Voice Messaging App, such as VMA1, which would then do the decompressing. Similarly, a member could set up his communication device (the Voice Messaging App) so that, for any specified person on his Contacts list (or for all of them), a voice message is always forward by server VMS, along with its header.

Figure 3:
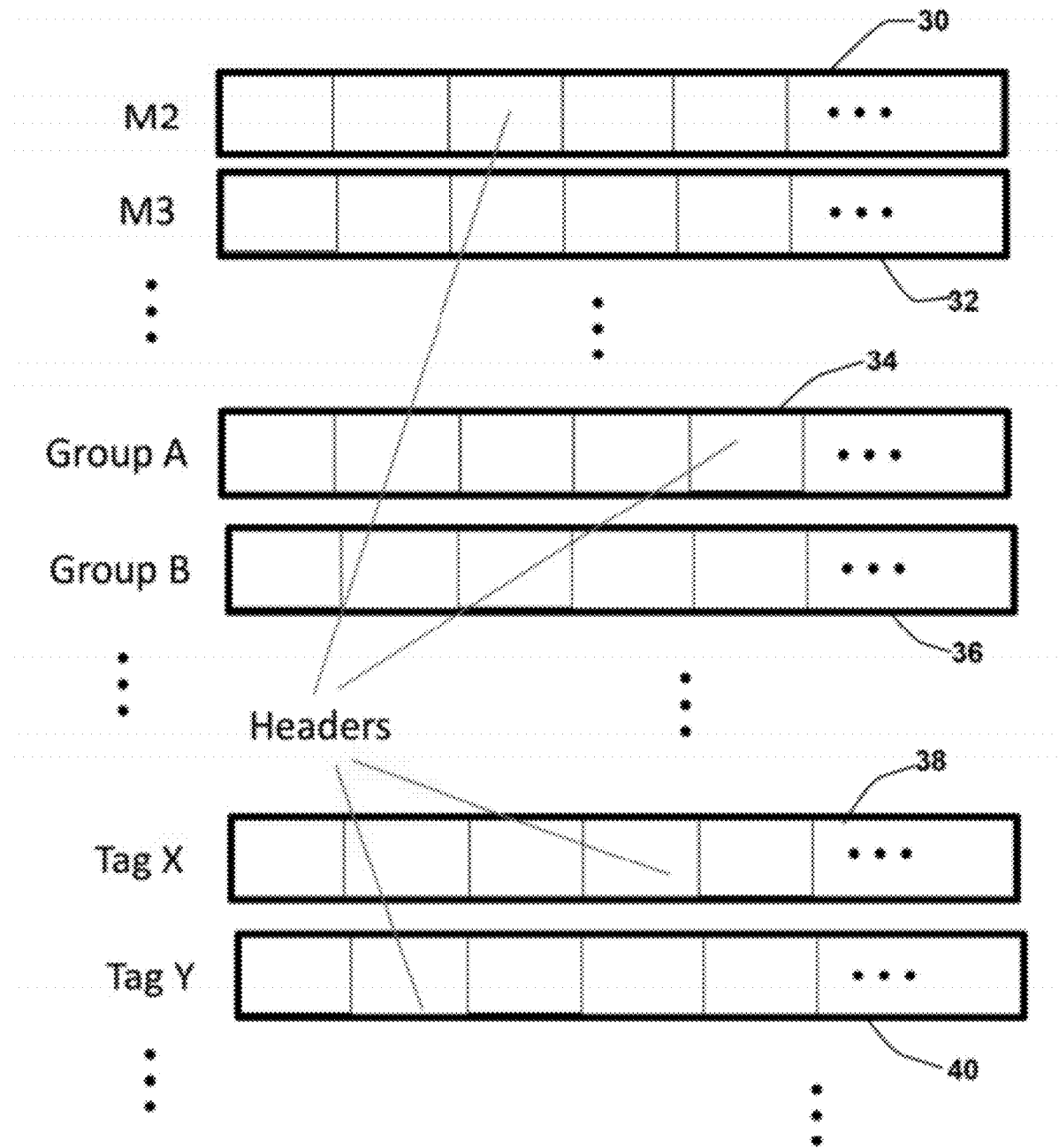
FIG. 3 is a schematic representation of how messages are presented to a member M1.

An important function of a member's Voice Messaging App is to present a summary of a member's voice messages in a way that is most relevant and useful to him. FIG. 3 is a schematic representation of how messages are presented to member M1. Instead of listing sent or received messages chronologically, the messages, both sent and received, are organized according to names in M1's Contacts list. The message list 30 shows all the messages exchanged between members M1 and M2, those sent to and received from M2. Similarly, message list 32 shows messages exchanged with member M3. However, a message list can contain any group of messages as defined to be meaningful by member M1. For example, it may contain group lists, such as 34 and 36, identifying messages to groups of users (e.g. Group A or Group B) created by him, or a message list may contain a group of messages, such as 38 and 40, identified by any term significant to member M1, in this case represented as "Tag X" and "Tag Y." The key concept is that messages can be presented to member M1 in ways that he defines and considers to be the most meaningful for his own use, based upon parameters of the sender, the messages, the recipient, the time of day, or any other suitable parameters.

As mentioned above, the system also allows members to send voice messages to non-members who have a reachable address, such as a PSTN telephone number or an e-mail address. Non-members may be included in the Contacts list. In order to send a voice message to a non-member, member M1 sends it to server VMS in the manner described above, and the message is stored by server VMS. Inasmuch as the recipient is a non-member, he has no Voice Messaging App for server VMS to correspond with. Server VMS will therefore act in a manner based upon the type of address of the recipient. If the address is a PSTN telephone number, server VMS invokes an automated attendant, for example, to place a call to the recipient over the PSTN, announce that a message has arrived from member M1, and play the message over the PSTN channel. As an additional example, if the telephone number corresponds to a mobile number server VMS may invoke an SMS function which sends a text message to the recipient instructing him to listen to a message through a PSTN number. When he has completed listening to the message, the recipient can be given an option to record a reply, or he can be provided with an identification number which he can use during a later call to server VMS to record a reply message.

On the other hand, if the non-member recipient is being contacted at an e-mail address, server VMS can simply send an e-mail notification to the recipient, with a link pointing to the media file containing the message. The non-member recipient can then play the recorded message at any time. In addition, the non-member recipient can be provided with a reply identification number, which he can use during a PSTN telephone call to server VMS to record a reply to member M1.

It is also contemplated that a member could post a voice message to a social networking site for sharing purposes. Of course, the member must have permission to post messages on the particular site, and he must grant permission to server VMS to access his account on that site. For example, member M1 could add his own Facebook account as an entry in his Contacts list and then send messages for posting on his Facebook wall. The posted Facebook message will include a link pointing to the voice message media file on server VMS, which is then accessed in the same manner as messages posted to a non-members e-mail account.

It should be appreciated that, in the event that a member is unable to use his communication device, or in the event that his Voice Messaging App becomes inoperative, the member could still dial a PSTN call into server VMS. Server VMS has a software program responsive to voice or touchtone commands over the telephone. When a member is properly authenticated and identified, he can enter commands to screen a particular message list, record new messages, or listen to received messages. Although this is far less convenient than using a communication device containing a Voice Messaging App, at least the member is not completely cut off from the service.

Although preferred embodiments of the invention have been disclosed for illustrative purposes, those skilled in the art will appreciate that many additions, modifications, and substitutions are possible without departing from the scope and spirit of the invention as defined by the accompanying claims.

What is claimed:

1. A system providing communication of recorded voice messages over a network among a plurality of users having voice communication devices, the network including a voice message server connected to the network, comprising:

a receiver constructed to receive from a sending user's communication device, over the network, a voice message signal including a header component identifying the sending user and intended recipient user, and a recorded voice message component;

storage means storing voice message components in association with the corresponding header component;

a transmitter constructed to transmit a received header component to the communication device of the intended recipient identified in the header component, the transmitter transmitting the corresponding voice message component to the recipient user's communication device only in response to the recipient user's communication device requesting the same;

an executable program running on a user's voice communication device, constructed to:

record a user's voice message and create a voice message component therefrom;

based on user input, create a corresponding header component;

create the voice message signal and communicate it to the voice message server;

receive from the voice message server a header component of a voice message signal from another user; and responsive to user input, requesting from the voice message server a voice message component of a voice message signal from another user; and an interface at the server sensing when the recipient of a voice message does not have the executable program running on the recipient's communication device and providing a warning indication, a further transmitter responsive to the warning indication to transmit to the recipient over a public network a notification that the recipient has a voice message waiting, and a further receiver responsive to a call back from the recipient over the public network to transmit the voice message to the recipient.

2. A method comprising receiving an audio message at a server, determining if an intended recipient of said audio message is registered, if not, contacting said recipient in accordance with a message type specified by the audio message, if so, transmitting only a first portion of such message to said recipient while storing a second portion of said message, wherein said first portion includes header or identification information and said second portion includes substantive content; and if said recipient is registered, making a second determination, and transmitting said audio message in a manner depending at least in part upon said second determination.

* * * * *